(12) United States Patent
Pollard et al.

(10) Patent No.: US 7,082,218 B2
(45) Date of Patent: Jul. 25, 2006

(54) COLOR CORRECTION OF IMAGES

(75) Inventors: Stephen Bernard Pollard, Gloucestershire (GB); Andrew Arthur Hunter, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 480 days.

(21) Appl. No.: 10/216,648

(22) Filed: Aug. 12, 2002

(65) Prior Publication Data

US 2004/0028271 A1    Feb. 12, 2004

Related U.S. Application Data

(63) Continuation-in-part of application No. 10/134,491, filed on Apr. 30, 2002.

(30) Foreign Application Priority Data

Jul. 27, 2001    (GB)    ................................ 0118456.3

(51) Int. Cl.
*G06K 9/00* (2006.01)
*G06K 9/40* (2006.01)

(52) U.S. Cl. ..................................... 382/167; 382/263

(58) Field of Classification Search ................ 382/162, 382/165, 166, 167, 254, 260, 264, 276, 284, 382/263; 358/518, 520, 523, 539; 348/222, 348/254, 609; 345/589, 600, 603, 604; 375/240.25; 386/114
See application file for complete search history.

(56) References Cited

U.S. PATENT DOCUMENTS

| | | | |
|---|---|---|---|
| 4,574,300 A * | 3/1986 | Hulyer ................... 375/240.25 |
| 5,189,511 A | 2/1993 | Parulski et al. ............. 358/518 |
| 5,438,424 A * | 8/1995 | Ozaki et al. ................. 386/114 |
| 5,483,294 A * | 1/1996 | Kays .......................... 348/609 |
| 5,523,785 A * | 6/1996 | Muramoto ................... 348/254 |
| 5,887,077 A | 3/1999 | Bongardt et al. ........... 382/149 |
| 5,965,875 A | 10/1999 | Merrill ....................... 250/226 |
| 6,556,707 B1 * | 4/2003 | Yagishita et al. ........... 382/162 |
| 6,642,932 B1 | 11/2003 | Kok et al. ................... 345/606 |
| 6,724,945 B1 | 4/2004 | Yen et al. ................... 382/274 |
| 6,738,169 B1 * | 5/2004 | Nakase ....................... 358/539 |
| 6,829,385 B1 * | 12/2004 | Nakase ....................... 382/166 |
| 6,833,868 B1 | 12/2004 | Meynants et al. .......... 348/272 |
| 6,836,289 B1 | 12/2004 | Koshiba et al. ............. 348/273 |
| 2002/0008760 A1 * | 1/2002 | Nakamura ................... 348/222 |
| 2004/0028271 A1 * | 2/2004 | Pollard et al. .............. 382/162 |

FOREIGN PATENT DOCUMENTS

| GB | 2378077 | 1/2003 |
|---|---|---|
| JP | 10-187949 | 7/1998 |
| JP | 2003-110860 | 4/2003 |

OTHER PUBLICATIONS

"Digital Image Processing", pp. 189-201, Addison & Wesley, 1992.

(Continued)

*Primary Examiner*—Andrew W. Johns
*Assistant Examiner*—Amir Alavi

(57) ABSTRACT

A raw image consists of a plurality of pixels in a plurality of color planes giving a color image. The raw image is split into at least a low frequency image and a high frequency image. At least the low frequency image is color corrected to produce a color corrected low frequency image. The color corrected low frequency image is combined with at least the high frequency image to give a final image which is of comparable resolution to the raw image but is color corrected.

29 Claims, 9 Drawing Sheets

OTHER PUBLICATIONS

C. Tomasi and R. Manduchi, "Bilateral Filtering for Gray and Color Images", *Proceedings of the 1998 UEEE International Conference on Computer Vision*, Bombaym, India.

Kharitonenko et al., "Suppression of Noice Amplification During Colour Correction", IEEE Transactions on Consumer Electronics, vol. 48, No. 2, May 2002 (published), pp. 229-233.

Kharitonenko et al., "Suppression of Noise Amplification During Correction", IEEE Transaction on Comsumer Electronics, vol. 48, No. 2, May 2002 (published), pp. 229-233.

* cited by examiner

Black and White

RGB Mosaic

Red     Green     Blue

COLOR CORRECTION OF IMAGES

RELATED APPLICATIONS

The present application is a continuation-in-part of U.S. patent application Ser. No. 10/134,491, filed Apr. 30, 2002, which claims the benefit of priority of British Patent Application No. 0118456.3, filed Jul. 27, 2001, the disclosure of both applications are hereby incorporated by reference herein in their entirety.

BACKGROUND TO THE INVENTION

1. Field of the Invention

This invention relates to methods and apparatus correcting the colour of a digital colour image.

2. Description of Related Art

Colour correction of digital colour images is required in a number of image processing contexts.

One important environment is in consumer digital imaging. It is common to produce consumer colour sensors by introducing an alternating pattern of colour filters onto the array of individual sensor elements. This is often referred to as a colour mosaic and a commonly used variant is the RGB Bayer pattern, which has alternating rows of green/red and blue/green pixels (thus having twice as many green pixels as red and blue) on a regular grid. A process known as demosaicing is carried out to generate a full RGB image from an image captured with such a sensor.

It is very difficult to construct color filters for sensors which exactly match the spectral characteristics of our eyes or which exactly match the primary colours used in computers to represent or display images for this reason it is necessary for the captured images to be processed to correct the sensed colours to the desired colour system. In addition, there may well be more noise in one channel than another, and it is desirable to avoid mixing noise from a noisy channel (typically blue) into a less noisy channel (typically green). The amount computation required may he a significant issue or restraint, particularly in a consumer system with limited processing power.

These issues apply to other contexts in which colour correction is required, such as for images generated by imaging systems having sensor elements that have multiple colour receptors (stacked vertically) at each pixel location, three CCD sensors (one for each colour plane), by flatbed colour scanners, or by other imaging systems in which the colour image is formed from sets of separate, registered RGB images. Certain of these issues may apply to other contexts also such as printing where colour correction is used to map from a standard RGB colour space to the RGB space of the printer (prior to the final transformation to the physical CMYK space of the printer).

BRIEF SUMMARY OF THE INVENTION

According to a first aspect of the invention, there is provided a method for transforming the colour of an initial image, the initial image having a plurality of image pixels and at least two colour planes, with each image pixel having an intensity value for at least one of the colour planes, the method comprising the steps of creating a low frequency image and a high frequency image from the initial image; transforming the colour of the low frequency image; and combining the high frequency image and the low frequency image to form a colour transformed image.

According to a second aspect of the invention, there is provided an imaging system comprising a sensor adapted to obtain an initial image having a plurality of image pixels and at least two colour planes with each image pixel having an intensity value for at least one of the colour planes, and a processor programmed to carry out the following steps on the initial image: create a low frequency image and a high frequency image from the initial image; correct the colour of the low frequency image; and combine the high frequency image and the low frequency image to form a colour corrected image.

According to a third aspect of the invention, there is provided a camera containing an imaging system comprising a sensor adapted to obtain an initial image having a plurality of image pixels and at least two colour planes with each image pixel having an intensity value for at least one of the colour planes, and a processor programmed to carry out the following steps on the initial image: create a low frequency image and a high frequency image from the initial image; correct the colour of the low frequency image; and combine the high frequency image and the low frequency image to form a colour corrected image.

According to a fourth aspect of the invention, there is provided an image processing method for correcting the colour of a colour image, the image being composed of a plurality of image pixels and each image pixel having one of at least two colour values and having a luminance value representing the intensity of the colour value for that pixel in the image, the method comprising the steps of: for each colour value, generating from the pixels for that colour value a low spatial frequency monochrome image composed of smoothed image pixels; applying a colour correction function to the smoothed image pixels for one or more of colour values in order to generate one or more corresponding corrected smoothed images, said function including for the or each colour value a contribution from corresponding smoothed image pixels having one or more of the other colour values; generating one or more high spatial frequency luminance images from the image; and combining the high spatial frequency luminance image(s) with the or each of the corrected low spatial frequency monochrome images to form the full colour image.

According to a fifth aspect of the invention, there is provided method for transforming the colour of an initial image, the initial image having a plurality of image pixels and at least two colour planes, with each image pixel having an intensity value for at least one of the colour planes, the method comprising the steps of; decomposing the initial image into two or more image components at different spatial frequencies; applying a different colour transformation to at least one of the image components from that applied to at least another of the image components; and recombining the image components to form a colour transformed image.

BRIEF DESCRIPTION OF THE DRAWINGS

The invention will now be described in further detail, by way of example with reference to the following drawings.

DETAILED DESCRIPTION OF THE INVENTION

Figure 1:
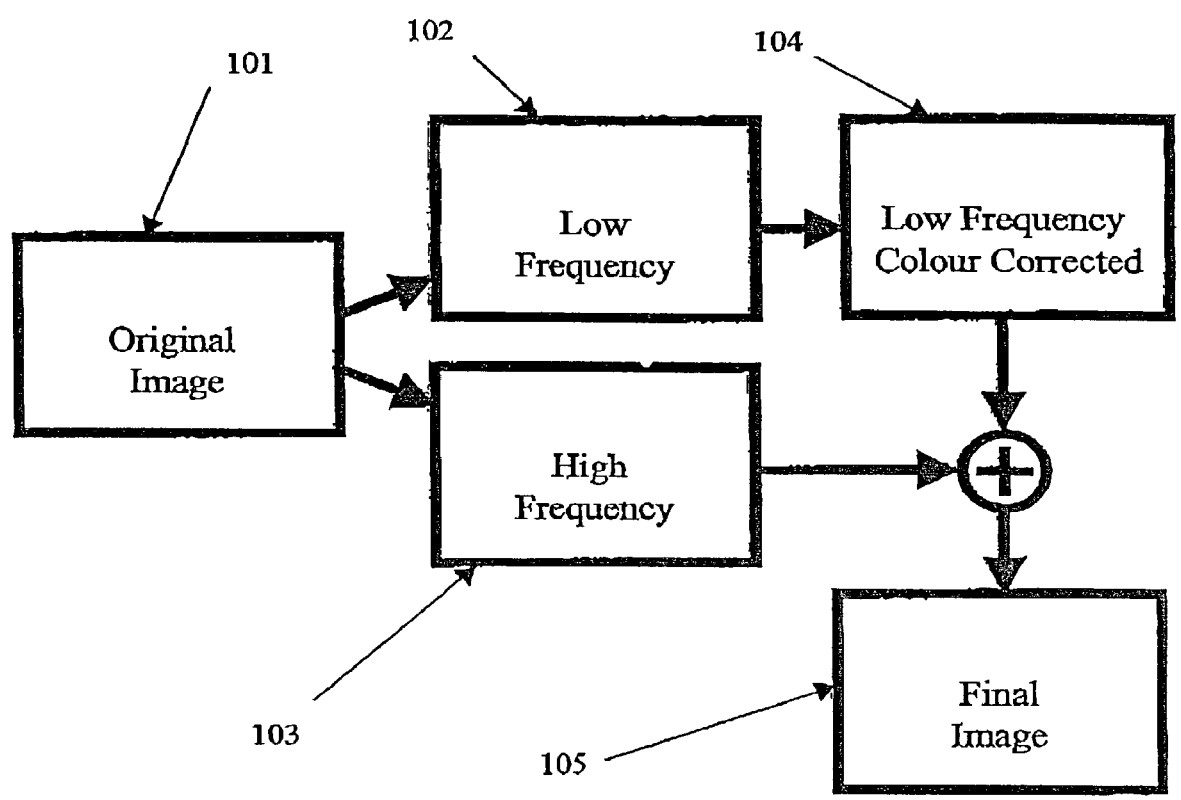
FIG. 1 illustrates schematically the basic steps of a colour correction process according to aspects of the invention.
Figure 2:
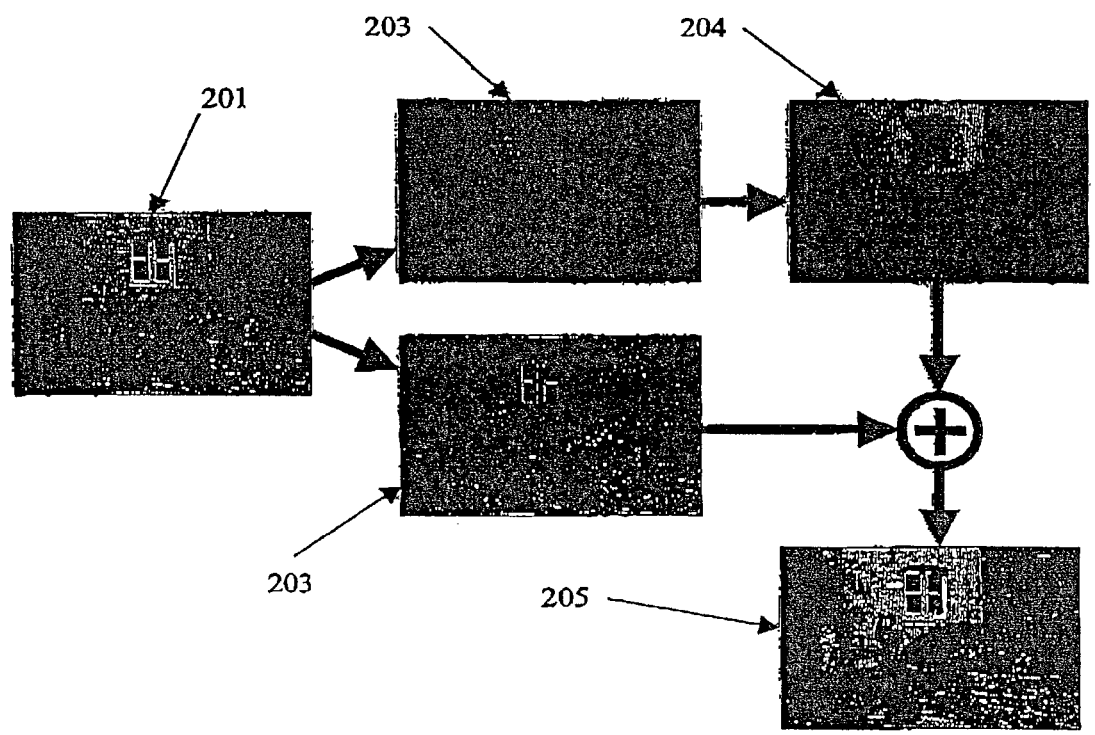
FIG. 2 shows images representative of the basic steps of the colour correction process illustrated in FIG. 1.

The overall approach to colour correction methods and apparatus employed by aspects of the invention will first be discussed below, followed by more detailed discussion of the individual elements of the approach. Enhancements to the basic approach will then be discussed. After this, application of aspects of the invention to different systems in which colour correction is required will be discussed.

A raw image 101,201 consists of a plurality of pixels in a plurality of colour planes (generally three) giving a colour image. The method can be applied usefully if individual pixel locations have values for only one colour plane (i.e. the pixels form a mosaic), for more than one of the colour planes, for all of the colour planes, and even it the pixels of one colour plane are not directly associated with pixels of another colour plane but are registered separately (as is the case where each colour is detected by a separate CCD sensor, for example).

The first step in the basic method is to split the raw image 101,201 into a low frequency image 102,202 and a high frequency image 103,203. A basic approach to this is to remove high frequency elements in the image by smoothing to obtain the low frequency image 102,202, and then to find the differences between the raw image 101,201 and the low frequency image 102,202. These differences will be the high frequency information and form the high frequency image 103,203.

The next step in the basic method is to perform colour correction on the low frequency image 102,202 to produce a colour corrected low frequency image 104,204. The fundamental operation involved here is to use combinations of values from different colour planes to achieve new colour values which more closely represent a desired result (almost invariably so that the colours of the image correspond more closely to the colours that humans would perceive observing the scene or representation that the raw image depicts when displayed using a standard viewing device or method). In the basic method, no colour correction is carried out on the high frequency image 103,203—this is treated as a monochrome image. This is a reasonable approximation, as most of the colour information is carried in the low spatial frequencies and the human visual system has less spatial sensitivity in chrominance than luminance.

The next step is to combine the colour corrected low frequency image 104,204 with the high frequency image 103,203. This combination gives a final image which is of comparable resolution to the raw image 101,201—as high frequency components of an image are highly sensitive to resolution, but low frequency components are not—but is colour corrected.

This approach has a number of advantages. The transform does not amplify or mix noise between the various colour planes. Very effective colour correction can be achieved with substantially reduced computation—this largely follows because the low frequency data, on which the colour correction is carried out, can be sub-sampled so that far fewer individual calculations are required. Splitting off the high frequency data can have other advantages—the high frequency data can itself be manipulated to enhance the final image (for example, to achieve sharpening or to remove noise).

Separate stages of this process will now be described in more detail.

Creation of the Low Frequency Image

The low frequency image 102,202 is created by use of an appropriate smoothing technique—smoothing and low pass filtering are essentially the same operation. Smoothing is a well-known operation and a number of different techniques are available (as discussed in, for example, Gonzalez and Woods, "Digital Image Processing", pages 189 to 201, Addison & Wesley, 1992).

To create the low frequency image 102,202, each colour plane is treated separately—if as in general there are three colour planes, there will be in effect three low frequency images created. If there is a luminance value for each pixel of interest in each colour plane, no treatment will be needed to the images in addition to smoothing. However, if this is not the case (so that there will not be a low frequency image fully populated in each colour plane) an interpolation step or similar will be required—this will be discussed further in the context of demosaicing. For the present, it is assumed that there is a luminance value for each pixel in each colour plane, so the result of low pass filtering and colour correction will be to form a full resolution colour corrected low pass image to which the high frequency image can then be added.

As indicated above, a range of filtering techniques are available, including use of finite response filters, infinite response filters and processing in the Fourier domain. However, a particularly advantageous approach is to use block averaging—this may smooth slightly less effectively than some other approaches, but benefits from hugely simplified computation. A particularly effective approach is indicated in FIG. 3.

Figure 3:
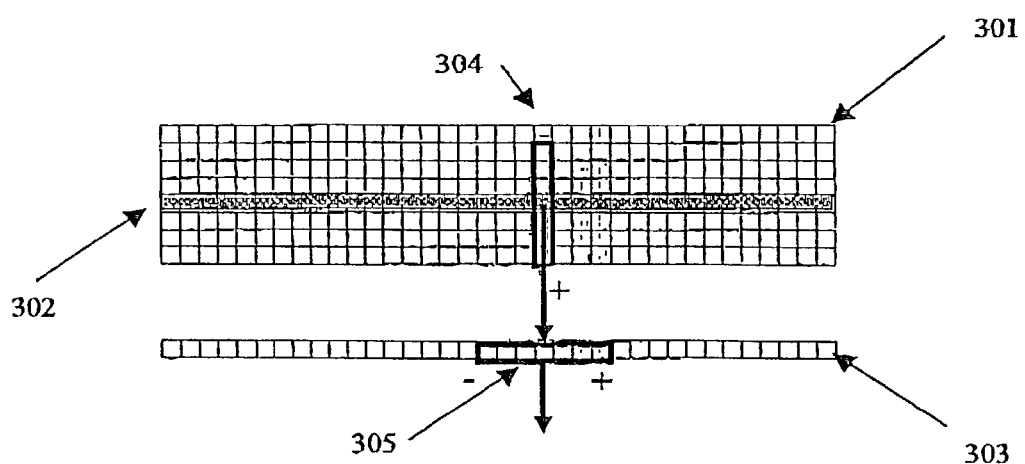
FIG. 3 shows an approach to block averaging of pixel data useful in various embodiments of the present invention.

FIG. 3 shows averaging over a 7×7 block of pixels A separate low pass image is computed for each colour plane, so the raw image 301 shown here (which could be, for these purposes, a raw image with interpolated values for "missing" pixels) is an image for one colour plane only. The current row 302 and the current column 304 define a current cell for which the averaging takes place. A partial sum buffer 303 is used to keep partial column sums for each location across the width of the image. Image rows are processed in order from the top to the bottom of the image. As each new image row is processed, the partial sum for each pixel on one row can be used to compute the partial sum for each pixel on the next through the addition of the pixel value from the new image row entering the 7×7 neighbourhood and the subtraction of the pixel value from the image row that has just exited.

In this way, the values on the partial image buffer 303 can be updated for each new row with minimal computation. When a row has been fully entered, the final sum for each pixel location along the image row can be calculated. Window 305 shows the partial sums that need themselves to be summed to achieve a total value for the current pixel of interest. A similar recurrence relationship along the row of partial sums (removing the partial sum exiting the window, and adding the partial sum entering the window) gives the final sum for each location along the image row. The final division by 49 to give the block average is achieved using a fixed multiplication and shift operation whose values depend on the accuracy required and the precision available. Computation is therefore significantly reduced in comparison to other low pass filtering methods.

For example, assuming 8 bit data to represent our image data, if we wish to limit our arithmetic to 32 bits precision we can achieve the required division by 49 by multiplying our final sum by the value 342392 (2 to the power 24 [16777216] divided by 49 and rounded to the nearest integer) and shifting the result 24 bits to the right. Higher precision can be maintained by shifting less than the full 24 bits. In fact the effect of the scaling is to divide by 49.00002.

Restricting block averaging to odd-sided blocks (3×3, 5×5, 7×7, 9×9 . . . ) ensures that the block-averaged image is centred over the same pixel locations as the original.

Creation of the High Frequency Image

This is a straightforward procedure. For each of the colour planes concerned, the high frequency image is simply calculated by the pixel-wise sum:

high_pass=raw_image−low_pass

Clearly, raw_image can be reconstructed by adding together the low_pass and high_pass equivalents.

High frequency information is largely achromatic and hence closely coupled between all colour planes, and thus will be substantially similar in each colour plane (much of the high frequency image consequently appears grey even close to edges). Moreover, the human visual system is not as sensitive to high frequency chrominance changes as it is to luminance changes. This fact is made use of in the colour coding of TV signals and modern compression schemes which have greater spatial resolution in luminance than in chrominance. Effective colour correction to the image as a whole can therefore be achieved by simply adding the high_pass data back to the colour corrected low frequency image.

Colour Correction of Low Frequency Image

Normally all three sets of original smoothed image pixels—assuming three colour planes—are processed to make a colour correction.

For example, an improved green signal at a point in an image may be derived from a weighted combination of the red (R), green (G) and blue (B) signals at that point.

$$C_g([R, G, B]) = dR + eG + fB,$$

where $C_g(m)$ gives the corrected value for a green pixel coming from the RGB triplet m.

To correct all of the colours at the point of the image, a 3×3 matrix multiplication can be used:

$$C([R \ G \ B]) = [R \ G \ B]\begin{bmatrix} a & d & g \\ b & e & h \\ c & f & i \end{bmatrix},$$

where C(n) gives the corrected values for the RGB triplet n.

Although a colour correction may be needed for all three colour values, for simplicity, the details of just one colour correction for the green colour value are described below. In order to reduce the computational requirement, preferred embodiments involve performing the colour correction only on a sub-set of the complete set of smoothed image pixels.

Consider now a 3×3 block of uncorrected low spatial frequency smoothed green image pixels, denoted by the values G1 to G9:

| G1 | G2 | G3 |
| G4 | G5 | G6 |
| G7 | G8 | G9 |

The corresponding colour corrected low spatial frequency green values g1 to g9 can be represented by:

| g1 | g2 | g3 |
| g4 | g5 | g6 |
| g7 | g8 | g9 |

A sub-set is of the smoothed image pixels G1–9 is selected, consisting of the corner values G1,G3,G7 and G9. The colour correction calculation is performed only for these four image pixels, with the other image pixels being interpolated, as follows:

$$\begin{matrix} g1 & g2 & g3 \\ g4 & g5 & g6 \\ g7 & g8 & g9 \end{matrix} = \begin{matrix} C_g(G1) & (g1+g3)/2 & C_g(G3) \\ (g1+g7)/2 & (g1+g3+g7+g9)/4 & (g3+g9)/2 \\ C_g(G7) & (g7+g9)/2 & C_g(G9) \end{matrix}$$

There are, of course, many other possible sub-sets which may be selected, and many other interpolation or extrapolation schemes for calculating corrected image pixels not in the selected sub-net. This example, however, in which the selected smoothed image pixels come from both alternate rows and alternate columns, gives excellent results with a significant savings in the required computation.

Methods such as the one described herein require far less computation than traditional colour correction methods. For example, the described method requires approximately one-quarter of the computation with little or no detectable loss in image quality.

Furthermore, because the colour correction is performed on low spatial frequency pixels in which noise in any of the colour channels is smoothed out, the colour correction does not mix noise between colour planes or increase the amount of noise in the colour corrected image.

Formation of Final Image

Again, this step is straightforward, involving a pixelwise addition for each colour plane between the pixels of the high frequency image 103,203 and the pixels of the colour corrected low frequency image 104,204. The resolution is effectively provided by the high frequency image, so use of subsampling in producing the colour corrected low frequency image should have no significant effect on the resolution of the final image 105,205.

Note that in most arrangements it will not be necessary to store the whole raw image frame in volatile memory. The image processing can be performed on the fly, thus requiring only as much memory as is necessary to perform the imaging pipeline. So after the first few rows of image data have been read from the sensor into memory it is possible to generate compressed image data for the start of the image and begin storing these in long term memory. This results from the fact that all processes are essentially local and operate only on a limited area of the image.

In other words, although the "images" constructed at each stage of the process could be complete sets of data that extend across the entire image, in practice this adds cost in terms of memory and possible throughput. Therefore, the "images" used at each stage of the process will in general be created piecemeal, with the process operating locally. In the limit all the computation may be carried out for a single pixel from the pixels in its neighbourhood.

Enhancements to High Frequency Image

The basic scheme described above can give rise to a specific type of artefact. As indicated above, the high frequency data is usually closely coupled between the colour channels. This is not true however for strong chromatic edges—these are edges which appear in one colour plane and are not present, or have very different or reversed contrast, in others.

While it is generally sufficient to use the original high frequency information (full colour) as the high frequency data after colour conversion, this approach does lead to visible artefacts in rare circumstances—these artefacts occur close to highly chromatic edges (themselves rare) and even then only when the colour conversion is severe. Such a severe correction may be required when the spectral density functions of the sensor (spectral density functions are used to describe the spectral response of the red, green and blue elements of the sensor) are broad and result in large elements in the colour transformation matrix employed perform colour correction.

These colour artefacts result from the fact that the original high frequency component no longer describes the high frequency component of the colour corrected image. The effect of adding back inaccurate high frequency information is to introduce regions along edges where the combined colour information either overshoots or undershoots the true value.

One approach to preventing this chromatic edge artefact from occurring in the final image is to add a colour correction step to the processing of the high frequency image before recombining it with the colour corrected low frequency image. Because of the linear nature of all the operations involved adding a colour corrected high frequency image to a colour corrected low frequency image results in the true colour corrected image. Of course such an image will also have the noise in the high frequencies amplified and mixed by the colour correction matrix—in fact, such an approach would initially appear to obviate the advantages of splitting the image into high frequency and low frequency images (why not simply colour correct the whole image?). In practice, however, these advantages are largely retained because colour correction is only required in the vicinity of a chromatic edge. This in discussed in more detail with respect to FIG. 4.

Figure 4:
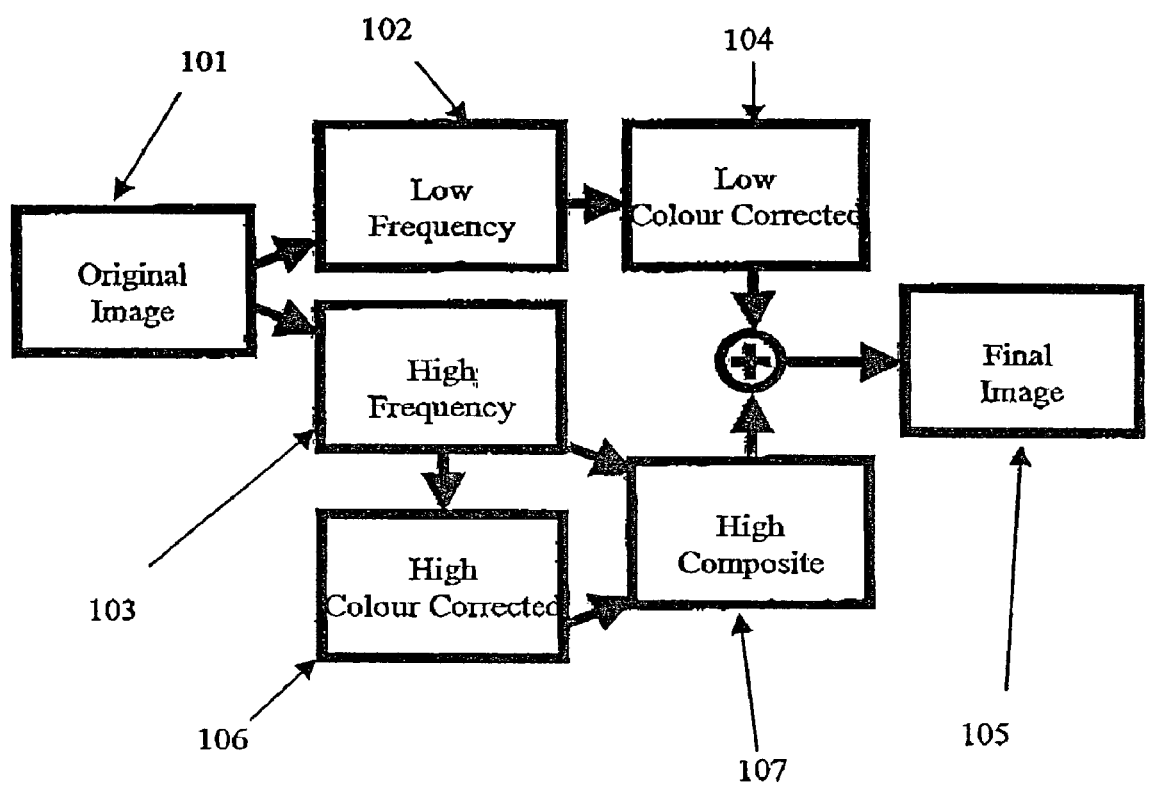
FIG. 4 illustrates schematically a modification to the basic steps of the colour correction process shown in FIG. 1, the modifications being according to one aspect of the invention

FIG. 4 shows addition of a high frequency colour correction step by building of a composite high frequency image 107. This composite high frequency image 107 contains colour corrected high frequency image data 106 close to chromatic edges and uncorrected data from high frequency image 103 elsewhere (all reference numerals occurring in both FIG. 1 and FIG. 4 are used in the same manner in each Figure). This composite high frequency image 107 is then added pixelwise to the colour corrected low frequency image 104 to produce the final image 105. This approach has the effect of limiting colour correction (and hence the mixing and amplification of noise) to regions close to edges, where the effects of noise will be less visible. As before, away from chromatic edges noise will not he amplified.

As previously indicated, it in only necessary to use the colour corrected high frequency image 106 close to a chromatic edge. For these purposes, a chromatic edge can be defined as a difference between the colour corrected and uncorrected high frequency images that exceeds a particular visibility threshold.

Figure 5:
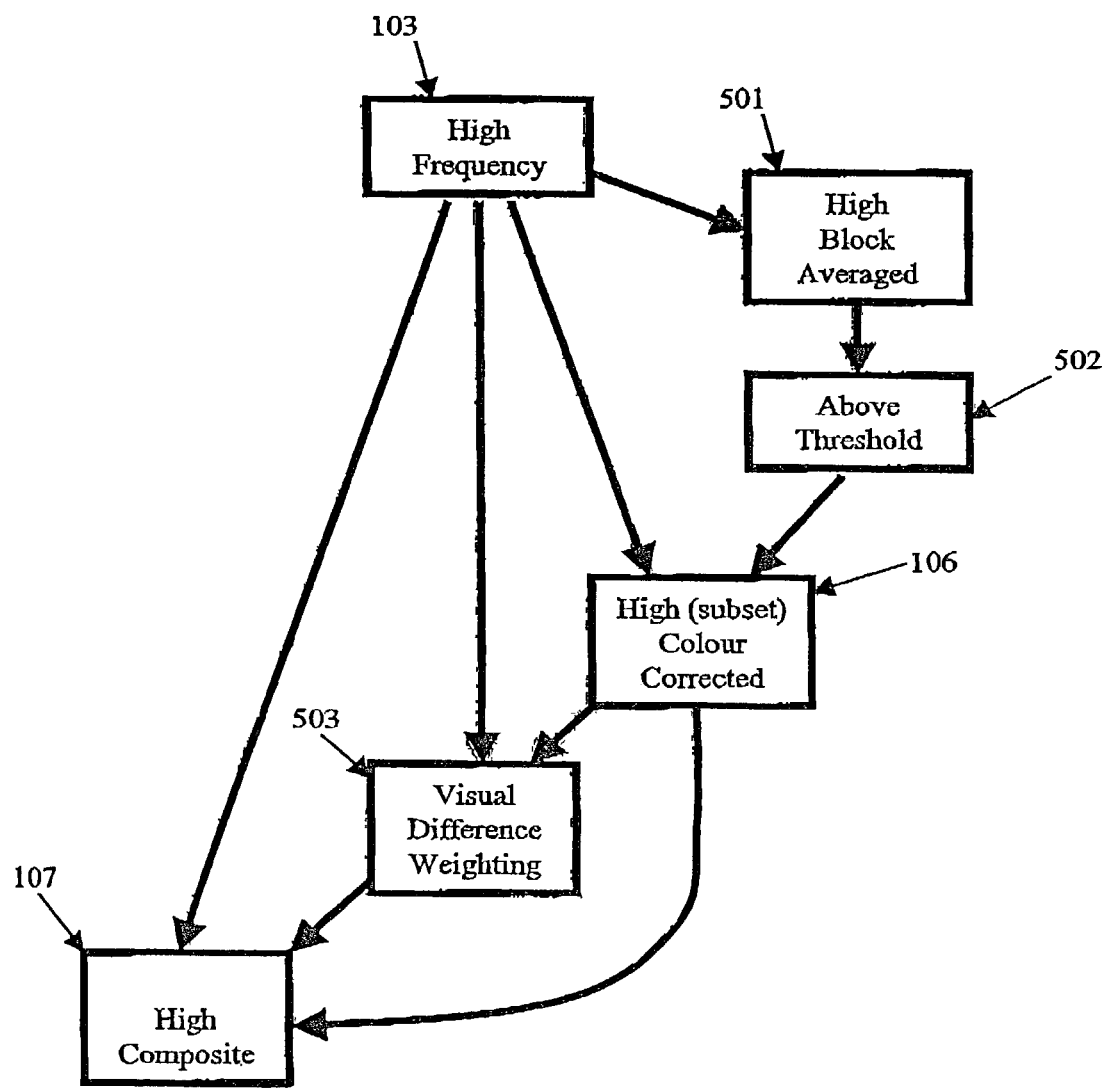
FIG. 5 illustrates schematically a preferred approach to implementing the modifications of FIG. 4.

One approach to defining such a visibility threshold, and to creating a composite high frequency image 107, is discussed below with reference to FIG. 5. The first step is to detect significant edges in the high frequency image 103 There are a number of possible ways to do this, but a computationally simple and effective approach is to use block averaging 501. Exactly the same approach can be taken to conducting the block averaging as has been described above with reference to creation of the low frequency image 102 (using a neighbourhood of a 7×7 pixel grid is again appropriate). However, in detecting edges, we now look at the averaged pixel values of high frequency image 103 to see if they indicate the locality of an edge—high values are likely to indicate the presence of edges whereas random noise will generally be smoothed away. As it is reasonable to assume that noise will be normally distributed, the expected standard deviation of the noise in the block averaged pixel values ($1/\sqrt{N}$) of the measured noise in the raw image; where N is the number of pixels used to compute the average [in our case N=49 so the standard deviation of the noise in the block averaged image will be $\frac{1}{7}$]) can be used to determine the likelihood of whether a high value will be caused by noise, with a difference of twice the standard deviation occurring by chance 5% of the time, and a difference of three times the standard deviation occurring by chanceless than 1% of the time. Either criterion (or comparable criteria) could be used to decide that a statistically significant edge was present.

The block averaged high frequency image 501 can thus be used to identify statistically significant edges by determining (step 502) pixels that lie above a threshold determined as indicated in the preceding paragraph. The image regions close to statistically significant edges can then be evaluated to determine whether they are also chromatic edges which would introduce colour artefacts. The next step is to create a high frequency colour corrected image 106. The computational burden of this is not as great as might be imagined, because this image only needs to be created for pixels at or in the vicinity of the statistically significant edges identified in the edge determining step 502.

Colour artefacts can now be detected by detecting for each pixel whether there is a visible difference between the colour corrected high frequency image 106 and the uncorrected high frequency image 103. When there is a visible difference between the two, the pixel value from the colour corrected high frequency image 106 should be used. The reason for using the colour corrected high frequency image 106 only where necessary to remove an artefact (rather than simply using the colour corrected high frequency image 106 for every statistically significant image) is that the colour corrected high frequency image 106 contains noise that the uncorrected high frequency image 103 does not contain.

The actual value used for the visibility threshold may itself be dependent upon the overall intensity level for each colour plane. Colour transforms are typically applied to linear sensor data—however for display and file transfer purposes the data is subject to non-linear transformations that more closely match the characteristics of typical image displays and the human visual system. It is possible to use the colour corrected low-pass image data to determine the local visibly significant threshold for each colour plane in such a way as to make allowance for subsequent non-linear transformations that may be applied to the data in processing stages downstream of colour correction (and so outside the present discussion).

Potential colour artefact positions have thus been obtained from the thresholding step 502. The pixels in these positions are those assessed by checking that there is a visibly significant chromatic edge, and if so, the colour corrected pixel is used (step 503) The output after step 503 is a pixelwise selection between the uncorrected high frequency image 103 and the high frequency colour corrected image 106 according to whether the matrix indicates the presence of a visibly significant chromatic edge or not.

In a typical scene only a very small percentage of image locations will correspond to high chromatic edges—provided these can be identified efficiently time and computational cost can still be saved over conventional forms of colour correction.

Many other similar schemes for identifying pixels close to chromatic edges are possible—for example we could construct an image from the difference between the colour corrected and original high-pass images and find significant edge regions within that image. This would find edges effectively, but does have the significant computational cost of creating a colour corrected high frequency image for every pixel.

Typically only a small percentage of image locations require high-pass colour correction. As this process amplifies and mixes noise, it may be advantageous to further process these regions to reduce the effects of noise. As we are dealing with relatively small number of image locations it may be possible to employ a more computationally intensive method of noise reduction that would be the case if the method was applied to the whole image and yet still fit within an overall computational budget. One such approach may be to use the Bilateral Filter (C. Tomasi and R. Manduchi, "Bilateral Filtering for Gray and Color Images", *Proceedings of the* 1998 *IEEE International Conference on Computer Vision*, Bombay, India). While traditional spatial filters, as their names suggest, only weight the contribution to the filter as a function of the spatial location of neighbouring pixels with respect to the pixel under consideration, Bilateral Filters also weight the contribution according to a function of the pixel similarity. Consequently, by using the Bilateral Filter the contributions originating from pixels across an edge can be chosen to be much smaller than that from pixels on the same side of the edge. In this way noise can be removed while maintaining structure and location of edges.

It is possible that having a hard threshold for proximity to a significant edge and the presence of a visibly significant colour difference could together lead to the creation of a visible contour around the areas in which colour correction has been made. Such a contour can be prvented by using a soft transition between use of the colour corrected and uncorrected versions of the high-pass data in the composite. This can be achieved by blending the various data depending upon both the significance of the edge data and the colour difference by use of an appropriate mask.

A further consideration in relation to the high frequency image arises when subsampling is used to generate the low frequency image for colour correction. A more accurate result will be produced when carrying out such subsampling if the high frequency image is itself based on the subsampled data. The overall steps are modified to the following—a smoothed sub-sampled image is obtained, this is upsampled to obtain a fully populated smoothed image, this fully populated smoothed image is then used as low_pass to generate high_pass, which is then added back to a colour corrected and upsampled version of the same smoothed data to form the final image.

Plural Frequency Images

The general method discussed above teaches the splitting of a raw image into a high frequency image and a low frequency image, and colour transforming or correcting the two images separately. This method can readily be extended to use of three or more images, each representing different frequency components.

One effective way to do this is after using a first smoothing step (equivalent to that used to create the low pass image in the general method above) to create an intermediate mid-blur image, then to carry out a further smoothing step to create a further full-blur image. The difference between the original raw image and the mid-blur image gives the high frequency image, the difference between the mid-blur image and the full-blur image gives the intermediate frequencies, and the full-blur image itself gives the low frequencies. Clearly, this procedure could be extended further to give still more frequency bands.

Separate colour transformation or correction could then be carried out on each of these different frequency components in accordance with the different requirements of those frequencies. For example, good results may be achieved by full colour correction of the lowest frequencies, more selective colour correction of the intermediate frequencies, and exceptional colour correction (at visibly significant chromatic edges) of the highest frequency images. Noise characteristics differ at different frequencies also, so there is also potential to correct these different frequency images differently for noise also.

Examples of the use of this overall approach in different image processing environments will now be discussed below.

EXAMPLE 1

Demosaicing in a Consumer Digital Camera

Figure 6:
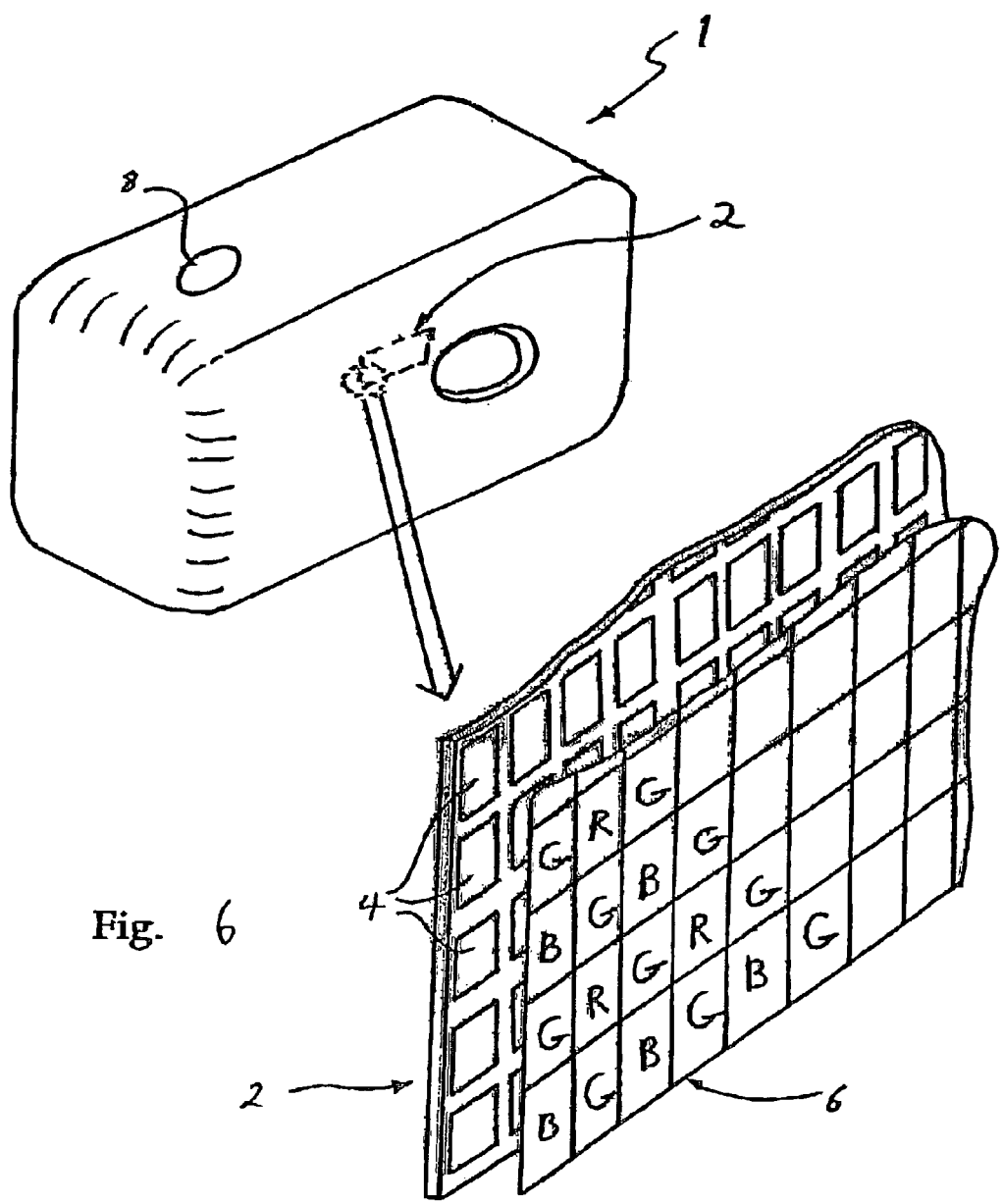
FIG. 6 shows schematically some of the internal components of a conventional electronic camera, including a colour sensor array having red, green and blue (RGB) imaging elements.

FIG. 6 shows one example of a consumer imaging device, here a hand-held digital camera 1. Such cameras have a colour image sensor 2 having a two-dimensional regular array of imaging elements or pixels 4. A typical consumer sensor array may have up to 4 Megapixels resolution, arranged in a rectangular array 2500 pixels wide and 1600 pixels high.

The imaging elements are sensitive to light across a wide spectrum of colours, and so the sensor array 2 is overlain by a mosaic-like pattern of colour filters 6. There are usually only three such colours, red (R), green (G) and blue (B), (RGB) and the colours are usually interleaved in a repeating pattern across the sensor array 2. Thus, the array elements 4 under each colour of filter 6 are sensitive only to light with wavelengths passed by each corresponding filter 6

Many filter patterns exist, but the most common is the Bayer filter pattern. This consists of pixels with colour filters arranged in a rectangular grid pattern as set out below:

```
G R G R . . . G R G R
B G B G . . . B G B G
G R G R . . . G R G R
. . . . . . . . . . .
B G B G . . . B G B G
G R G R . . . G R G R
B G B G . . . B G B G
``` where R, G and B represent red, green and blue colour filters respectively. For the Bayer pattern, there is a preponderance of green pixels in the sensor array, with these contributing half of the full sensor resolution, while the red and blue pixels each contribute one quarter of the resolution.

Figure 7:
FIG. 7 shows an example of original black and white text to be imaged by a colour sensor array such as that in FIG. 6.
Figure 8:
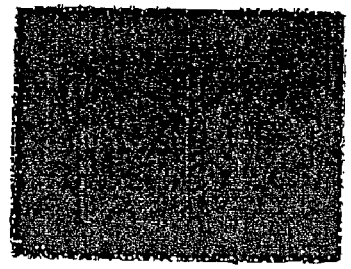
FIG. 8 shows the text when captured as an RGB mosaic image.

FIG. 7 shows an example of original black and white text 10, consisting of the symbols "▪▪", to be imaged by the digital camera 1. The text 10 is part of a larger document (not shown) that is to be imaged in a desktop document imaging application. FIG. 8 shows how the text 10 is imaged as an RGB mosaic 12 within a small portion of the sensor array 2 consisting of 35 pixels in a horizontal direction and 29 pixels in a vertical direction.

Figure 9:
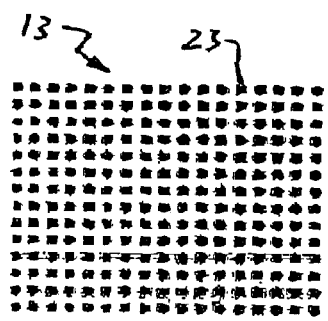
FIG. 9 shows the arrangement of red, green and blue pixels in the image mosaic of FIG. 8.
Figure 9:
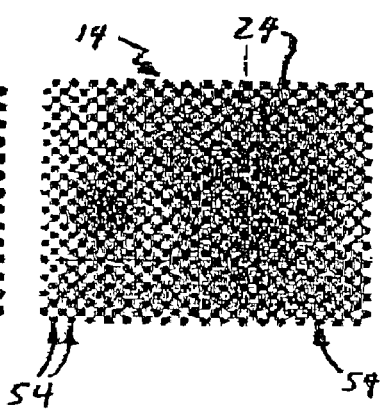
Figure 9:
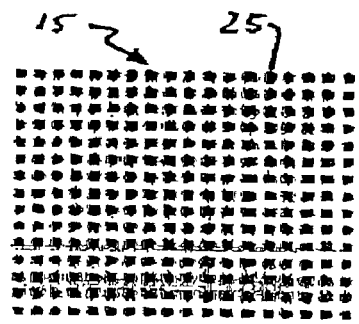
Figure 9:
Figure 9:
Figure 9:

The Bayer pattern can be seen most clearly in FIG. 9, which shows for the three colour values red 16, green 17 and blue 19, that there are twice as many green pixels 14 as red pixels 13 or blue pixels 15. The original text 10 is visible as different luminance levels of the pixels 13,14,15

Figure 10:
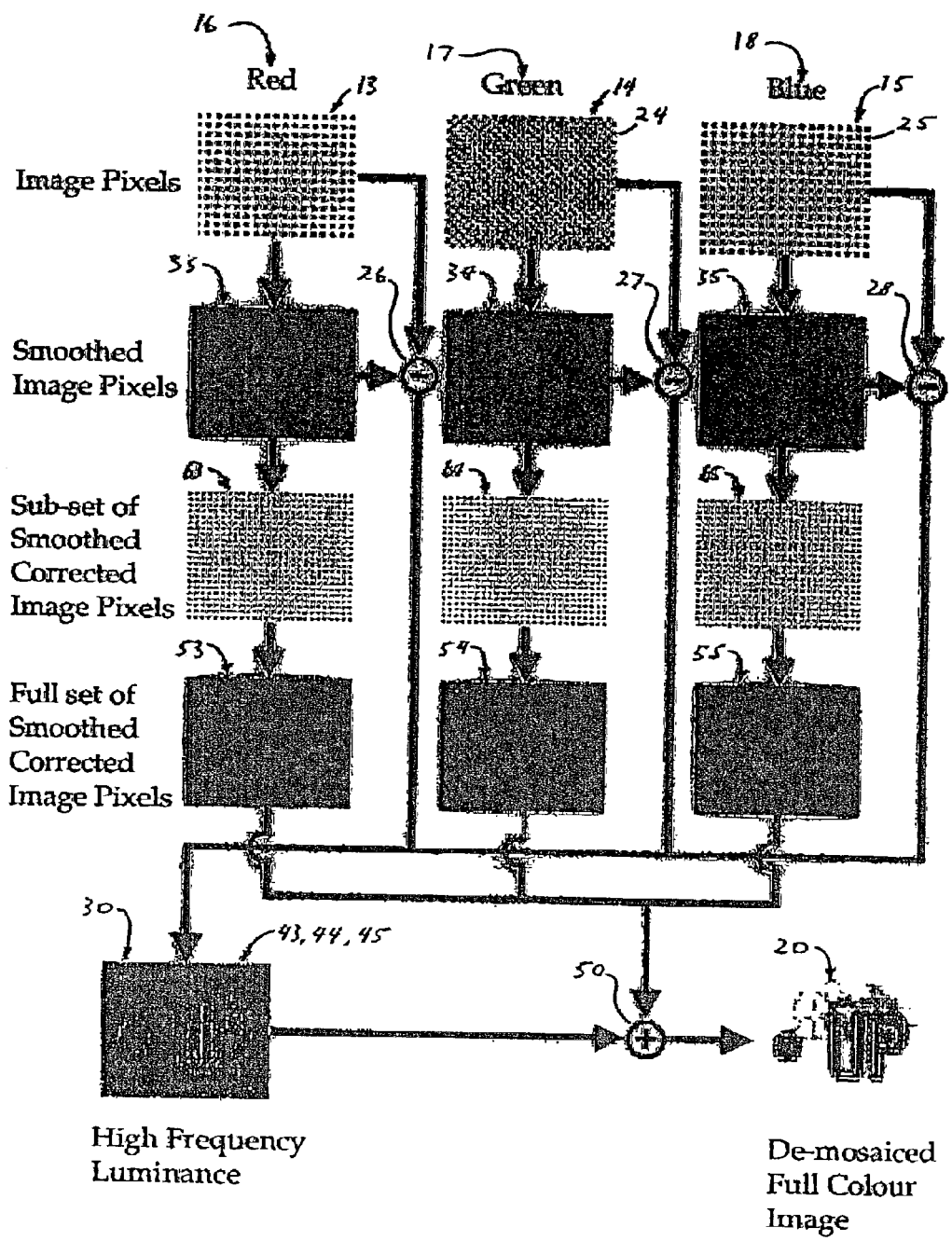
FIG. 10 shows schematically how the red, green and blue pixels are processed in a method according to an embodiment of the invention to yield colour corrected intermediate smoothed images, one for each colour value, and how these colour corrected images are then used to generate a de-mosaiced and colour corrected full colour image.

FIG. 10 shows schematically how the image mosaic 12 is processed to yield a colour corrected and de-mosaiced full colour image 20. First, for each colour value 16,17,18, a smoothed image 33,34,35 is formed. Then, for each of the three colour values 16,17,18, a difference is taken 26,27,28 between the luminance level of each individual pixel 13,14,15 for that particular colour value 16,17,18, and a corresponding point of the smoothed image of the same colour value. In this case, the high frequency image will be treated as being achromatic. This difference 26,27,28 is used to generate a high frequency image which when combined with similar differences for the other two colour values results in a composite high frequency image 30 that extends across all pixels locations in the original RGB image mosaic 12.

Therefore, the resulting composite image 30 is a monotone high frequency version of the original RGB image 12. Most conveniently, the high frequency image 30 consists of three sets of high frequency image pixels 43,44,45 at locations in the composite image 30 that correspond with the locations of corresponding sets of pixels 13,14,15 in the original RGB mosaic image 12 As can be seen in FIG. 5, these pixels 43,44,45 have different luminance values.

Each of the smoothed monochrome images 33,34,35 is formed by two-dimensional interpolation combined with low-pass filtering as described above. An interpolation step, or similar, is needed in this case to fully populate the low frequency image in each colour plane at each pixel location. It should be noted that there are many known methods that can be used in order to achieve the desired end result (a full resolution fully populated colour corrected low pass image) of the processing steps on the low frequency image—interpolation can take place before smoothing, after smoothing, or effectively combined together. In the present example, the smoothed images 33,34,35 are formed individually for each of the three colour values 16,17,18 using bilinear interpolation as a pre-processing step. All three smoothed images 33,34,35 then extend across locations corresponding with all elements of the RGB mosaic pattern 12.

One or more of the three sets of low spatial frequency image pixels 33,34,35 for the colour values 16,17,18 are then processed in order to generate up to three corresponding colour corrected low spatial frequency image pixels 53,54,55 in the manner described above FIG. 5 shows the general case where all three sets of original smoothed image pixels 33,34,35 are processed to make a colour correction.

After colour correction, the image can be demosaiced as follows. For each high frequency pixel 43,44,45, the achromatic high frequency luminance value is added 50 to a corresponding portion of each of the three colour corrected smoothed images 53,54,55, which results in a de-mosaiced full colour image 20. In the case that one or two of the colour values 16,17,18 do not require colour correction, then at this stage in the computation for that uncorrected colour value, the original uncorrected smoothed set of image pixels 33,34, 35 is combined with the corresponding high frequency pixels 43,44,45.

This method has the advantage of being relatively easy to compute in electronic hardware, while still giving good reconstructed image quality for colour corrected images.

Rather than interpolating the individual colour planes to full resolution, prior to smoothing, only to then sample the smoothed versions for colour correction it is possible to reduce the computation required still further by reducing the number of mosaic pixel locations at which the mosaic pattern is spatially filtered to produce the low spatial resolution images. As previously suggested, this results in smoothed images with lower spatial frequencies than might otherwise be the case (unless the degree of smoothing is itself reduced to accommodate the change in spatial resolution), but at no great ultimate loss in information content, for the reason that image details are reintroduced by adding the high frequencies as described above Preferably, smoothed images are computed only for a subset of the green pixels 14, for example as shown in FIG. 9 those green pixels in columns 54 (or alternatively rows) having both green pixels 14 and red pixels 13. For the Bayer pattern, this requires one quarter of the computation, required for smoothing, while the image quality remains almost constant.

For red and blue pixels, 13 and 15 respectively, this amounts to avoiding the initial interpolation stage and operating the smoothing on images formed from the raw red and blue pixels alone.

Therefore, each of the high spatial frequency images 44,45,46 is formed for each of the colour values 16,17,18 from the difference 26,27,28 between the luminance values of the image mosaic pixels 16,17,18 for that colour value and corresponding portions of the smoothed monochrome image 33,34,35 for that same colour value 16,17,18.

In other words, the high frequency component of each mosaic pixel is given by subtracting the mosaic value from the corresponding location of a smoothed version of the image for the same colour value.

In the colour correction computation, a good compromise between speed and quality is hence achieved when the colour correction is computed for alternate pixel rows and columns of the low frequency image, with the results being interpolated to the other nearby pixels.

The colour corrected and de-mosaiced full colour image 20 is then formed for each of the colour values 16,17,18 by summing each of the high spatial frequency images 30 with corresponding portions of the colour corrected smoothed monochrome images 53,54,55 for that colour value.

Figure 11:
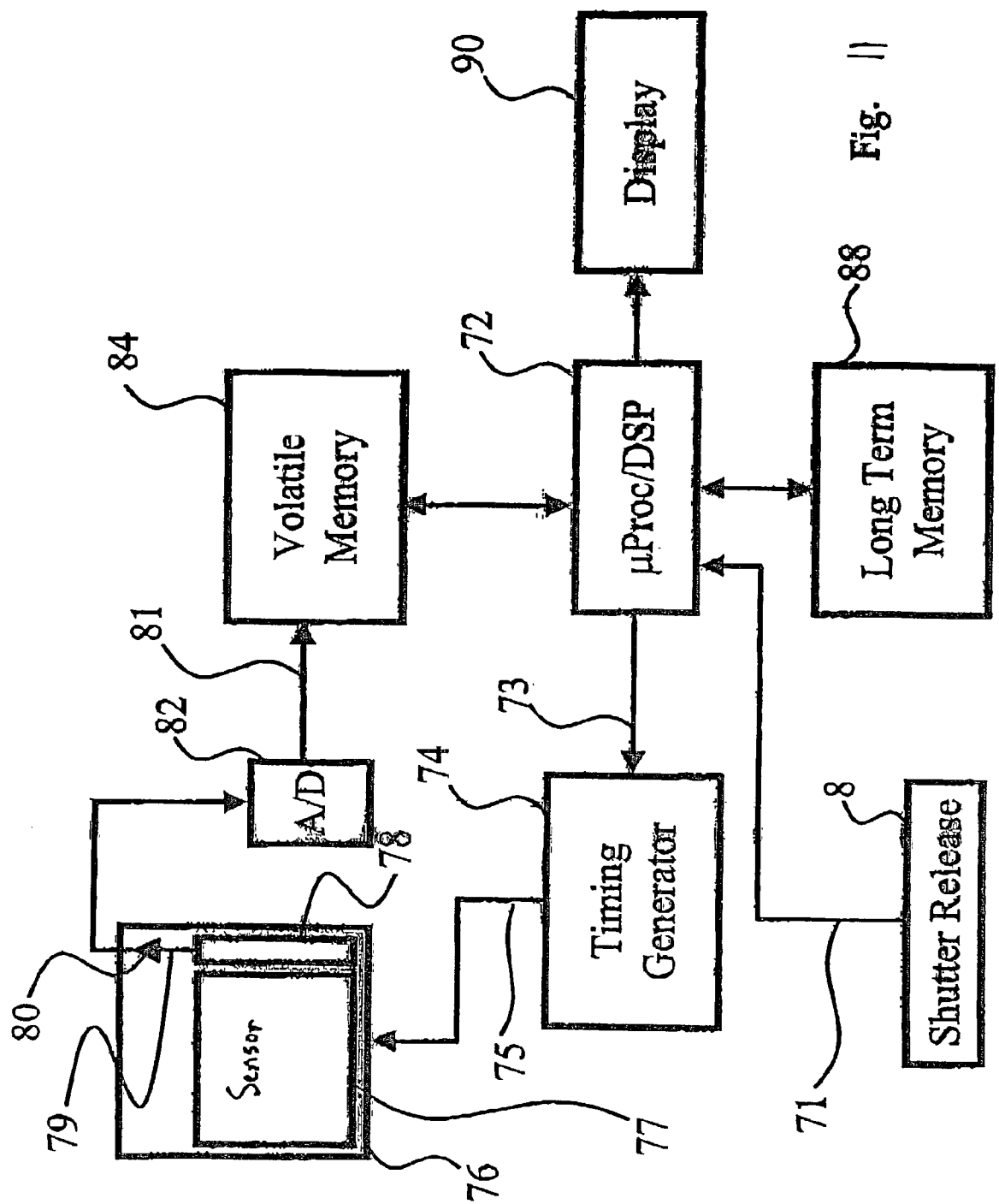
FIG. 11 is a circuit schematic diagram for a device according to an embodiment of the invention for de-mosaicing an image mosaic to form a full colour image, the device comprising a processor, software, and a memory.
Figure 12:
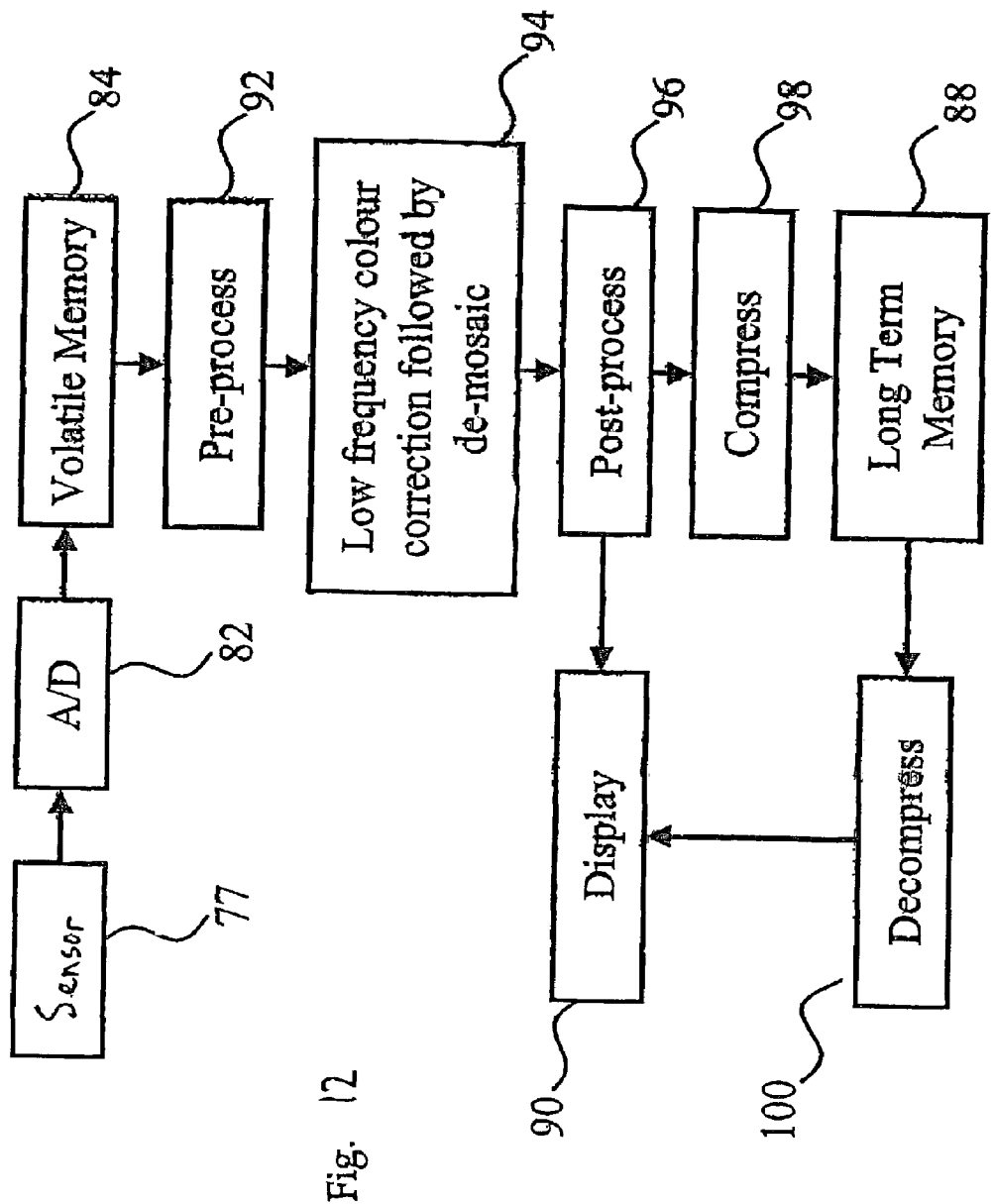
FIG. 12 is a flow chart illustrating a preferred embodiment of the method according to the invention for de-mosaicing an image mosaic to yield a full colour image.

The process described above may be readily implemented in hardware, illustrated in block schematic form in FIG. 11, and illustrated in the flowchart of FIG. 12.

A shutter release mechanism 8 when activated by a user sends a signal 71 to a microprocessor unit 72, which may include a digital signal processor (DSP). The microprocessor then sends an initiation signal 73 to a timing generator 74, whereupon the timing generator sends a trigger signal 75 to an electronic image sensor unit 76.

The sensor 76 consists of an imaging area 77 consisting of an array of sensing elements (typically either of a photogate or alternatively photodiode construction) and a serial readout register 78 from where an analogue signal 79 is generated via an amplifier 80. This signal 79 is generated upon receipt by the sensor unit 76 of the trigger signal 75.

The amplified analogue signal 79 is converted to a digital signal 81 by an A/D unit 82. The resulting raw digital image data is stored temporarily in a volatile memory 84.

Image processing according to the present invention can then be performed by the microproceesor unit 72. The microprocessor may include additional DSP capability in the form of specialised block of hardware to carry out specific functions or an additional more general DSP co-processor.

The processing itself may be performed according to the steps outlined in the flow-chart of FIG. 7. These include a pre-processing stage 92, which may typically include correction of the OECF (opto-electronic conversion function) of the sensor and white-balancing to compensate for variations in illumination. Following the colour correction and de-mosaicing stage 94 described above, a subsequent post-processing stage 96 may include exposure correction (which can also be accomplished at the pre-processing stage) and transformation to a standard colour space such as sRGB (as described in IEC 61966-2-1). Finally the reconstructed RGB image data can be compressed 98 and stored in long term memory 88 using a standard image compression scheme such as the ubiquitous JPEG scheme.

Additionally a display device 90 may be incorporated into the design. Images can be displayed live to facilitate viewfinding or reviewed from long term memory requiring an additional decompress processing stage 100.

Although a preferred embodiment of the invention has been described with reference to the Bayer pattern of image pixels, the invention is applicable to cases where not all rows and/or columns contain image pixels of at least two colours. For example, some mosaics have pure green rows and columns interleaved with red/blue rows or columns. The invention is equally applicable to such image mosaics.

EXAMPLE 2

RGB Correction

The invention can also be applied to cases where each location in the original colour image has overlapping or coincident pixels of multiple colour values. Such images can be generated by imaging systems having three CCD sensors, by flatbed colour scanners, or other imaging systems in which the colour image is formed from sets of separate, registered RGB images. Colour correction will generally be required as the RGB space of such imaging systems will typically need modification to an RGB space appropriate for human viewing.

The basic elements of an exemplary digital camera system of this type (and the general processing steps associated with image formation) may be essentially as shown in FIGS. 11 and 12. The difference is that sensor 76 is not a charge coupled device with an imaging area 77 covered with a filter mosaic, but instead a sensor of the type described in, for example, U.S. Pat. No. 5,965,875 in which separate photodiodes for each channel are provided for each pixel location (a CMOS sensor of this general type is the F7, available from Foveon, Inc., 2820 San Tomas Expressway, Santa Clara, Calif. 95051).

In contrast to Example 1, processing in this arrangement can follow the general case described above—the raw image is fully populated in each colour plane at each pixel location, so no interpolation steps (or other modifications to address mosaic requirements) need to be addressed.

EXAMPLE 3

Colour Space Transformation

As indicated above, embodiments of the present invention can be applied to a number of contexts in which colour correction is required. In the cases described above in Examples 1 and 2, minor correction is required (typically from one RGB space to another) rather than major transformation. The goal of using such a colour correction mechanism in Examples 1 and 2 is to map between the RGB spaces of various physical input and output devices in a manner that is pleasing to the human visual system It is sometimes convenient or desirable to convert to a colour space that is not RGB. Aspects of the present invention may be employed for such transformation to achieve benefits in noise reduction. One circumstance where this may apply is in mapping of an image into a different colour space [CMYK] for printing.

Colour space transformation to a colour space that is not RGB may most effectively be achieved in two stages by first mapping from a device RGB colour space to a chosen perceptual RGB space (such as sRGB) using the methods of this invention and from there to the non-RGB colour space using a standard 3×3 matrix transformation.

For example the transformation for linear data according to the sRGB standard to YCrCb is given by $Y = 0.299R + 0.587G + 0.114B$ $Cr = 0.701R - 0.587G - 0.114B$ $Cb = -0.299R - 0.587G + 0.886B$ This transform separates a colour signal into its luminance (Y) and chrominance (Cr and Cb) components and is typically used for image compression (for example in JPEG:

though in that case it is applied after a non-linear mapping to allow for, amongst other-things, the gamma of a typical display device).

It may be convenient to combine the transformation from raw device RGB to sRGB with the conversion to a colour space like YCrCb for computational efficiency. If for example our transform from device RGB to sRGB is of the form $$R=1.987R'0.53G'-0.124B'$$

$$G=-2.614R'+5.862G'-2.248B'$$

$$B=0.977R'-4.560G'+4.583B'$$

This gives an overall transformation from device RGB to YcrCb of $$Y=-0.829R'+2.663G'-0.834B'$$

$$Cr=2.816R'-3.526G'-0.710B'$$

$$Cb=1.806R'-7.223G'-5.417B'$$

Because YCrCb is so far from the original RGB it is no longer appropriate to add the original high pass data to the colour converted low pass version. We can however reduce the amplification of noise to that we would have seen using the 2 stage approach outlined above. This is achieved by applying the sRGB→YCrCb transformation to the high pass data prior to adding to the fully transformed (RGB→YCrCb) low pass image.

The invention therefore provides an efficient method with reduced sensitivity to image noise for colour correcting and reconstructing a high quality image, with the full effective resolution in each colour plane.

The invention claimed is:

1. A method of transforming the colour of an initial image, the initial image having a plurality of image pixels and at least two colour planes, with each image pixel having an intensity value for at least one of the colour planes, the method comprising the steps of:
   creating a low frequency image by spatial filtering the initial image;
   color correcting the colour of the created low frequency image; and
   creating a high frequency image of the initial image; and combining the high frequency image and the low frequency color corrected image to form a colour transformed image.

2. A method as claimed in claim 1, wherein the method transforms the colour by correcting it from a device RGB colour space to another RGB colour space.

3. A method as claimed in claim 1, wherein the method transforms the colour from an ROB colour space to a YcrCb colour space.

4. A method as claimed in claim 1, wherein each pixel includes intensity values for only one of the colour planes.

5. A method as claimed in claim 4, wherein the pixels are arranged in a mosaic pattern by colour plane.

6. A method as claimed in claim 5, wherein there are red, green and blue colour planes, and wherein there are more pixels in the green colour plane than in the red or blue colour planes.

7. A method as claimed in claim 6, wherein the pixels are arranged according to the Bayer mosaic pattern.

8. A method as claimed in claim 1, wherein each pixel includes intensity values for all the colour planes.

9. A method as claimed in claim 8, wherein the colour planes comprise a red colour plane, a blue colour plane and a green colour plane.

10. A method as claimed in claim 8, further including colour correcting the high frequency image only in the region of chromatic edges.

11. A method as claimed in claim 10, comprising the step of determining in the high frequency image chromatic edge pixels where a colour correction to a chromatic edge will be visually significant, and colour correcting such chromatic edge pixels.

12. A method as claimed in claim 11, comprising detecting in the high frequency image significant edge pixels at statistically significant edges, colour correcting the significant edge pixels, determining whether the difference in intensity values between the colour corrected significant edge pixels and the uncorrected significant edge pixels is visibly significant, and for those significant edge pixels for which the difference in intensity values is visibly significant, using the colour corrected intensity values.

13. A method as claimed in claim 1, in which the low frequency image after colour correction extends across all pixel locations of the initial image.

14. A method as claimed in claim 1, wherein the low frequency image is formed by averaging a block of pixels in the image pixels of that colour plane centered on an image pixel spatially equivalent to the smoothed image pixel.

15. A method as claimed in claim 14, wherein the block of pixels is a 7×7 block.

16. The method of claim 14, wherein the averaging the block of pixels to form the low frequency image for one color is performed in a partial sum buffer having stages corresponding to pixels in a first direction of the image, supplying luminescence values for the color and the pixels in the first direction to the buffer stages, forming partial sums in the buffer stages for corresponding pixels in the second direction of the image, and determining the average of the block from the partial sums.

17. A method as claimed in claim 1, wherein the colour correction is carried out on a subsampled low frequency image.

18. The method of claim 1, wherein the high frequency image is created by combining in a subtractive manner corresponding pixels of the created low frequency image and the original image.

19. An imaging system comprising a sensor adapted to obtain an initial image having a plurality of image pixels and at least two colour planes with each image pixel having an intensity value for at least one of the colour planes, and electronics for carrying out the following steps on the initial image:
   create a low frequency image by spatial filtering the initial image;
   correct the colour of the low frequency image;
   form a high frequency image of the initial image; and
   combine the high frequency image and the corrected low frequency image to form a colour corrected image.

20. The system of claim 19 wherein the electronics includes a programmed processor.

21. The system of claim 19, wherein the electronics includes a partial sum buffer adapted to be responsive to luminescence values of at least one color of the image pixels, the partial sum buffer having stages corresponding to pixels in a first direction of the image, the stages arranged to be responsive to luminescence values for the color and the pixels in the first direction, and forming partial sums in the buffer stages, the electronics being arranged for determining the average of the block from the partial sums.

22. A camera having an imaging system comprising a sensor adapted to obtain an initial image having a plurality of image pixels and at least two colour planes with each image pixel having an intensity value for at least one of the colour planes, and electronics for carrying out the following steps on the initial image:
- create a low frequency image by spatial filtering of the initial image;
- correct the colour of the low frequency image;
- create a high frequency image of the initial image; and
- combine the high frequency image and the color corrected low frequency image to form a colour corrected image.

23. A camera as claimed in claim 22 wherein the camera further comprises a filter mosaic and wherein each pixel includes intensity values for only one of the colour planes and wherein the pixels are arranged in a mosaic pattern by colour plane created by the filter mosaic.

24. A camera as claimed in claim 22 wherein each pixel includes intensity values for all the colour planes.

25. The system of claim 22 wherein the electronics includes a programmed processor.

26. An image processing method of correcting the colour of a colour image, the image including a plurality of image pixels and each image pixel having one of at least two colour values and having one or more values representing the intensity of each colour value present for that pixel in the image, the method comprising the steps of:
- I) for each colour value, generating from the pixels for that colour value a low spatial frequency monochrome image including smoothed image pixels;
- II) generating one or more corresponding corrected smoothed images by applying a colour correction function to the smoothed image pixels for one or more of colour values, said function including for the or each colour value a contribution from corresponding smoothed image pixels having one or more of the other colour values;
- III) generating one or more high spatial frequency luminance images from the image; and
- IV) combining the high spatial frequency luminance image(s) with the or each of the corrected low spatial frequency monochrome images to form the full colour image.

27. An image processing method as claimed in claim 26 in which:
- V) in step II) said colour correction is applied only to a sub-set of low spatial frequency image pixels; and
- VI) prior to step IV) completing said corrected low spatial frequency monochrome image by at least one of interpolating and extrapolating from the sub-set of corrected smoothed image pixels whereby similarly corrected smoothed image pixels not in the original sub-set of corrected smoothed image pixels are generated.

28. A method of transforming the colour of an initial image, the initial image having a plurality of image pixels and at least two colour planes, with each image pixel having an intensity value for at least one of the colour planes, the method comprising the steps of:
- decomposing the initial image into two or more image components at different spatial frequencies;
- applying a different colour transformation to at least one of the image components from that applied to at least another of the image components; and
- recombining the image components to form a colour transformed image.

29. A method as claimed in claim 28, wherein no colour transformation is applied to one or more of the image components.

* * * * *

UNITED STATES PATENT AND TRADEMARK OFFICE
CERTIFICATE OF CORRECTION

| | | |
|---|---|---|
| PATENT NO. | : 7,082,218 B2 | Page 1 of 1 |
| APPLICATION NO. | : 10/216648 | |
| DATED | : July 25, 2006 | |
| INVENTOR(S) | : Stephen Bernard Pollard et al. | |

It is certified that error appears in the above-identified patent and that said Letters Patent is hereby corrected as shown below:

On the Title page, Item (75), in "Inventors", line 2, delete "Gloucstershire" and insert -- Gloucestershire --, therefor.

In column 1, line 40, after "may" delete "he" and insert -- be --, therefor.

In column 3, line 46, after "even" delete "it" and insert -- if --, therefor.

In column 6, line 54, delete "sub-net" and insert -- sub-set --, therefor.

In column 8, line 4, after "This" delete "in" and insert -- is --, therefor.

In column 8, line 19, after "will not" delete "he" and insert -- be --, therefor.

In column 8, line 20, after "it" delete "in" and insert -- is --, therefor.

In column 15, line 54, in Claim 3, delete "ROB" and insert -- RGB --, therefor.

Signed and Sealed this

Thirtieth Day of June, 2009

JOHN DOLL
*Acting Director of the United States Patent and Trademark Office*